US008739954B2

(12) United States Patent
Anouar et al.

(10) Patent No.: US 8,739,954 B2
(45) Date of Patent: Jun. 3, 2014

(54) CHARACTERIZING ITEMS OF CURRENCY

(75) Inventors: Fatiha Anouar, Glenmoore, PA (US); Gaston Baudat, Glenmoore, PA (US); Philippe S. Jard, Downingtown, PA (US)

(73) Assignee: MEI, Inc., Malvern, PA (US)

( * ) Notice: Subject to any disclaimer, the term of this patent is extended or adjusted under 35 U.S.C. 154(b) by 0 days.

(21) Appl. No.: 13/263,463

(22) PCT Filed: Apr. 7, 2010

(86) PCT No.: PCT/US2010/030277

§ 371 (c)(1), (2), (4) Date: Feb. 3, 2012

(65) Prior Publication Data

US 2012/0118698 A1 May 17, 2012

Related U.S. Application Data

(60) Provisional application No. 61/167,729, filed on Apr. 8, 2009.

(51) Int. Cl.
*G06K 7/12* (2006.01)
*G06K 9/00* (2006.01)
*G07D 7/06* (2006.01)

(52) U.S. Cl.
USPC .......... 194/207

(58) Field of Classification Search
USPC ........ 194/207; 250/559.1, 226; 382/135, 136, 382/137; 359/237, 238, 326, 337.2, 891
See application file for complete search history.

(56) References Cited

U.S. PATENT DOCUMENTS

| | | | | |
|---|---|---|---|---|
| 6,040,584 | A * | 3/2000 | Liu et al. | 250/559.11 |
| 8,232,534 | B2 * | 7/2012 | Beeson et al. | 250/484.2 |
| 2006/0037834 | A1 * | 2/2006 | Nago et al. | 194/207 |
| 2008/0185530 | A1 * | 8/2008 | Schuett et al. | 250/372 |

FOREIGN PATENT DOCUMENTS

| | | | | |
|---|---|---|---|---|
| EP | 1 239 423 | A2 * | 9/2002 | G07D 7/12 |
| EP | 1239423 | A2 | 9/2002 | |
| JP | S6290788 | A | 4/1987 | |
| JP | 06044437 | | 2/1994 | |
| JP | 2001-356689 | | 12/2001 | |
| JP | 2005072129 | A | 3/2005 | |
| JP | 2008003679 | A | 1/2008 | |
| WO | 01/61654 | A2 | 8/2001 | |
| WO | 03/054809 | A2 | 7/2003 | |
| WO | WO-2006056089 | A2 | 6/2006 | |

OTHER PUBLICATIONS

International Search Report dated Sep. 28, 2010 for International Application No. PCT/US10/030277.

* cited by examiner

*Primary Examiner* — Mark Beauchaine
(74) *Attorney, Agent, or Firm* — Mintz Levin Cohn Ferris Glovsky and Popeo, P.C.

(57) ABSTRACT

Characterizing an item of currency employs a validation apparatus that includes at least three specified light sources for illuminating the item of currency. Each of the specified light sources has an emission spectrum similar to an approximating function for reconstructing a predetermined set of spectrum. At least one receiver receives light emitting from the at least three specified light sources. A transportation unit transports the item of currency within the validation apparatus. The light received by the receiver is at least one of light reflected by or light transmitted through the item of currency.

28 Claims, 16 Drawing Sheets

CHARACTERIZING ITEMS OF CURRENCY

This application is a national phase filing under 35 U.S.C. §371 of international patent application number PCT/US2010/030277 filed Apr. 7, 2010, which claims priority to provisional U.S. Patent Application Ser. No. 61/167,729 filed Apr. 8, 2009, each of which is hereby incorporated by reference in its entirety.

FIELD OF DISCLOSURE

The disclosure relates to characterizing items of currency.

BACKGROUND

Many devices can be used to characterize items of currency. For example, a validation device, comprising a validation unit, can be used to characterize an item of currency. For the purposes of the disclosure, the term item of currency includes, but is not limited to, valuable papers, security documents, banknotes, checks, bills, certificates, credit cards, debit cards, money cards, gift cards, coupons, coins, tokens, and identification papers. In such state of the art devices the validation unit includes a sensing system often further comprising a source for emitting light and a receiver for receiving the emitted light. Validation (i.e., classification) of a currency item can involve the measurement and analysis of one or both of reflected light and light transmitted through a currency item.

Typical validation units are arranged to use a plurality of light emitting sources (e.g., Light Emitting Diodes (LEDs)) to gather reflective and/or transmission responses from a currency item. Generally these sources are configured such that they emit light within a relatively narrow band of wavelength within a spectrum. More particularly, commonly known sources (e.g., red LEDs, blue LEDs, and green LEDs) typically have an emission spectrum with a narrow band (between 15 nm and 35 nm). Examples of common sources can include red sources emitting light in the range of 640 nm to 700 nm, blue sources emitting light in the range of 450 nm to 480 nm, and green sources emitting light in the range of 520 nm to 555 nm. Often such common sources are configured to emit light within wavelength bands consistent with known colors within the visible spectrum (e.g., red light, blue light and green light). The response of a currency item to being illuminated with sources having emission within known color spectrums of visible light can be used to determine various characteristics about the item of currency. In some cases infrared light can be used to gather information about characteristics of an item of currency.

There exist image processing machines (e.g., document scanners or photocopiers) which use a plurality of sources and detectors to reproduce or store and image of a document. In the case of color images, it is often the goal of such image processing machines to gather characteristics from a document such that they can be reproduced to be visually equivalent to the human eye (i.e., discrimination like the human eye is capable of). The fact that the human eye acts like a three color imaging system, allows for the design of such image processing machines to be developed that reproduce a color image in a way that the human eye (or any imaging system with similar color limitations) cannot discriminate between the original image and the reproduced image.

A limitation of some current devices for classifying items of currency is that the typical common sources used result in gaps within the whole spectrum because each source generally emits in a narrow band of spectrum. One solution to this problem is to use a very large number of common type sources such that there would be sufficiently enough sources to cover the entire spectrum. This solution is undesirable because it leads to a very large and expensive validation apparatus. Furthermore, such a solution results in a device required to process very large amounts of data and thus is not as efficient as required for a currency validation apparatus (e.g., gaming machine, vending, machine, and ticketing machine, etc.) where validation is needed to be made in a relatively short period of time (e.g., less than one second).

State of the art devices can illuminate a currency item using sources within the validation unit either in a sequential manner (i.e., where each emitter illuminates in a different wavelength band) or simultaneously. Such a validation system is disclosed by U.S. Pat. No. 5,632,367, which is incorporated herein by reference in its entirety. Additionally, a validation unit can illuminate a currency item using a light bar type system to mix light from a plurality of sources. Such a light mixing system is disclosed in U.S. Pat. No. 6,994,203 and is incorporated herein by reference in its entirety.

A currency item being characterized by a validation unit can be discriminated in various ways commonly known in the art (e.g., Malahanobis Distance, Feature Vector Selection, or Support Vector Machine). Currency items can be characterized based on their color response as disclosed in currently pending U.S. Provisional Application Ser. No. 61/137,386, which is incorporated herein by reference.

SUMMARY

The disclosure relates to characterizing items of currency. In an implementation, there is provided a validation apparatus for characterizing a currency item and can include a validation unit comprised of a sensing unit having at least one source and at least one receiver for receiving emissions from the at least one source. In some implementations the validation apparatus further includes a processor and a memory unit for carrying out the methods of the disclosure. In some implementations the validation apparatus includes a processor and memory unit for characterizing items of currency. In yet further implementations, a validation apparatus includes a transportation unit to move an inserted currency item to and through the validation unit, the transportation unit can be one continuous unit or a plurality of transportation units arranged to form a continuous path through the validation apparatus. A validation apparatus can further include a storage and/or dispensing portion. Currency items can be transported from the validation unit to (and from) at least one storage unit. In some implementations there is at least one of a one-way storage unit or a two-way storage unit. In some implementations the storage unit is removably coupled to the validation apparatus.

In some implementations, there is provided a method for establishing a reference set of spectrum, and applying a dimension reduction technique (e.g., principle component analysis or non-negative matrix factorization) to compress the reference set of spectrum into a second space (i.e., filter space) and obtain a set of approximating functions (i.e., filters) for approximating the reflectance (or transmission) spectrum and reconstructing the original reference spectrum.

In some implementations, there is provided a method for applying a non-negative matrix factorization to produce non-negative approximating functions.

In some implementations, there is provided a method for establishing at least one specified source whereby the at least one specified source has an emission spectrum similar to an approximating function for reconstructing the original reference set of spectrum.

In some implementations, there is provided a method for using light received (e.g., reflected by or transmitted through an item of currency) from a specified source having an emission spectrum similar to an approximating filter for reconstructing the original reference set of spectrum to characterize the currency item inserted into a validation apparatus.

In some implementations, there is provided a validation apparatus including at least one specified source having an emission spectrum similar to an approximating filter for reconstructing the original reference set of spectrum.

In some implementations, at least one specified source comprises an emitting element and an excitation element, such that energy emitted from the emitting element excites the excitation element to produce an emission spectrum similar to an approximating function for reconstructing the reference spectrum.

In some implementations, at least one broadband source is coupled to at least one physical element having a transmission spectrum similar to an approximating function for reconstructing the reference spectrum.

In some implementations, at least one receiver is coupled to at least one physical element having a transmission spectrum similar to an approximating function for reconstructing the reference spectrum.

In some implementations, the specified sources are Light Emitting Diodes (LED's) coupled to anexcitation element containing phosphor (or any other specified component of an excitation element). In some implementations, the Light Emitting Diodes are coupled to an excitation element containing a plurality of different phosphors having varying relative amounts (i.e., mixed) of each phosphor in order to produce an emission spectrum similar to an approximating function for reconstructing the original reference spectrum. In some implementations the relative amounts of different phosphors configured in an excitation element are adjusted from the identified amounts to account for losses and/or absorption of energy that result from their combination in order to produce an emission spectrum similar to an approximating function for reconstructing the original spectrum.

In some implementations, a group of specified sources are arranged such that their emitted light can be mixed in a light mixer (e.g., a light pipe core). The intensity of emission for each specified source in the group can be controlled by controlling the excitation current applied thereto. In some implementations, the amount of current applied to each specified source arranged in a light pipe configuration can be controlled by software in the validation apparatus. In some implementations, the control of currents applied to the plurality of specified sources can be controlled using a processor in the validation apparatus.

In some implementations, the amount of energy emitted from each of the plurality of specified sources can be controlled by varying the pulses (e.g., pulse width modulation (PWM) or amplitude) applied to each specified source in order to manage the amount of respective light used for mixing in a light pipe.

In some implementations, the validation apparatus comprises a plurality of specified sources each having an emission spectrum similar to an approximating function for reconstructing the original reference spectrum and at least one receiver for receiving emissions from each specified source. In other implementations, the validation apparatus comprises a plurality of broadband sources each having a physical filter associated therewith such that spectrum resulting from each broadband source and each specified physical filter is similar to an approximating function for reconstructing the reference spectrum.

In some implementations, the validation apparatus comprises a single broadband source and a plurality of receivers each having a specified physical filter associated therewith such that received light by each receiver is comparable to an approximating function for reconstructing the reference spectrum.

In some implementations, the validation apparatus comprises a plurality of standard sources each having an emission spectrum similar to known colors (e.g., red, green, blue, Infrared) and at least one specified source having an emission spectrum similar to a spectrum related to at least one specific item of currency.

Various aspects of the invention are described further below and are set forth in the claims.

DETAILED DESCRIPTION

Figure 1:
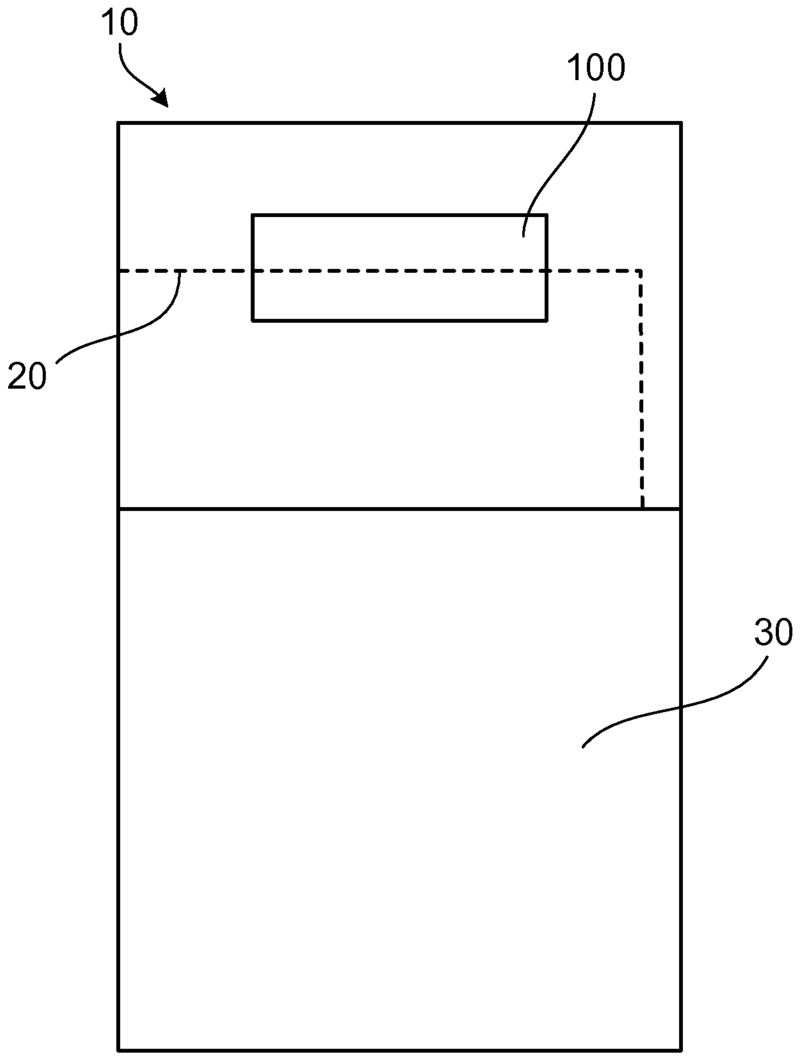
FIG. 1 illustrates an example of a document handling apparatus including a validation unit.
Figure 2:
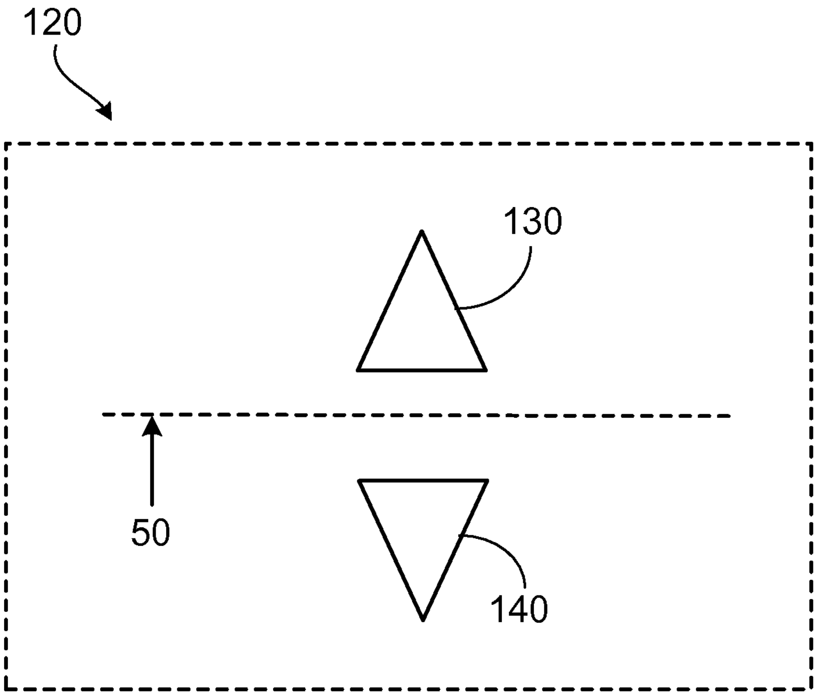
FIG. 2 illustrates a sensing unit of a validation unit including an electromagnetic source and a receiver for illuminating a document.
Figure 3:
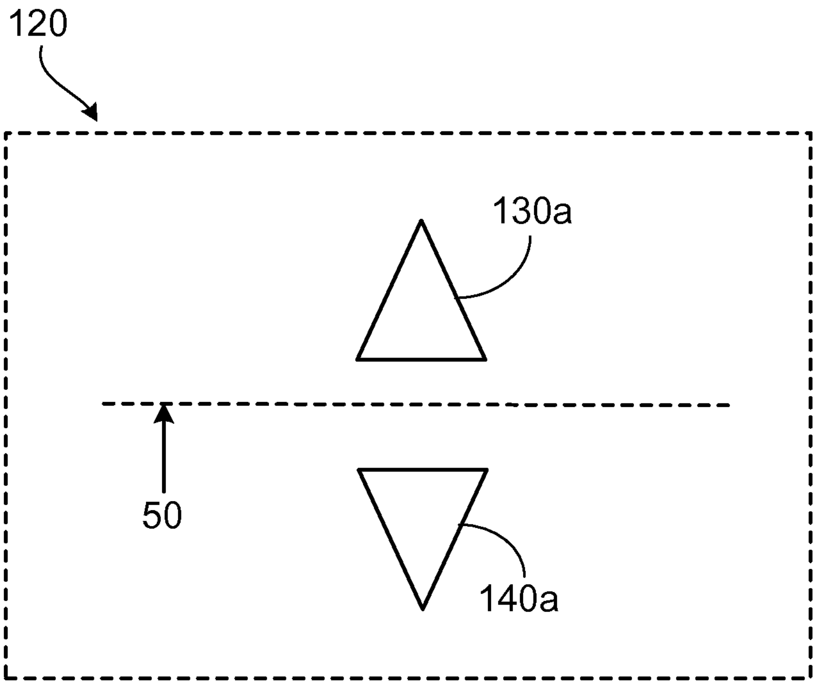
FIG. 3 illustrates a sensing unit of a validation unit including a unique electromagnetic source and a receiver for illuminating a document.

Various aspects of the invention are set forth in the claims.

The disclosure relates to classifying items of currency. For the purposes of the disclosure, classification of currency items includes, but is not limited to, recognition, verification, validation, authentication and determination of denomination.

In an implementation, a currency validation system 10 includes a validation unit 100 for classifying currency items (not shown) inserted therein. In some implementations, validation unit 100 includes a sensing unit 120 comprised of at least one source 130 and at least one receiver 140. For example, sensing unit 120 can be arranged to include at least one light emitting diode (LED) 130 and at least one receiver 140 for receiving light emitted from the LED 130. In some implementations, LED 130 emits light in at least one of the visible or the non-visible light spectrum.

In some implementations, a method is used to determine the number of light sources to be implemented in document handling unit 10. More particularly, a set of reference spectrum associated with at least one currency item 50, or a portion thereof, can be used as inputs to a dimension reduction technique. For example, the reference set of spectrum S can be used as inputs to a dimension reduction technique to achieve a form of data compression of the reference spectrum S. In some implementations the reference set of spectrum S is represented by a matrix of spectrum responses. In other implementations, a series of spectrum of patches (e.g., Munsell Patches or Pantone Patches) scanned in increments (e.g., every 1 nm) can be used to form the reference set S.

In some implementations, a method is used to simulate a reference spectrum, for example to reconstruct the spectrum of a non-authentic document such as a forgery or copy.

Once reference set S has been established, for example by at least one of the methods described herein, a data reduction technique can be used to reduce the amount of data used to estimate the entire set of original spectrum S. Examples of data reduction techniques (or dimension reduction techniques) include, but are not limited to Principle Component Analysis (PCA), non-negative matrix factorization (NMF), or dimension selection algorithms. In some implementations, the entire reference set S (or any sub-set thereof) can be used for classification.

In some implementations, a Munsell set of spectra (scanned every 1 nm) is used as inputs to a data reduction technique (or data compression technique). For example, 1269 Munsell patches (i.e., a Munsell set), each scanned every 1 nm wavelength from 380 nm-800 nm, can be used as inputs to the PCA in order to find the most relevant PCA axes. More specifically, using PCA as a tool, the Munsell set is transformed from an original multi-dimensional space to the PCA space where each axis of the PCA space is a linear combination of all the variables (i.e., a function) from the original space. Using this technique, it can be determined that the first few axis of the PCA space explain most of the variance in the original data set (e.g., reference set or Munsell set). One of the results of using the PCA transformation is that the weights associated with the newly combined linear combinations (i.e., functions) of the original reference set S can be both negative and non-negative. In order to produce a non-negative result from applying PCA to the original reference set S, a transformation is needed to establish a new set of filters (i.e., functions) in which all the coefficients are positive.

Non-negative matrix factorization (NMF) is an example of another dimension reduction technique which can be used to find a new space (i.e., filter space) with positive coefficients so that the approximating functions are positive and therefore have a physical meaning.

When using non-negative matrix factorization, the variables can be obtained where the coefficients of the functions are the weights obtained by the non-negative matrix factorization. These functions can physically be built as filters (or sources) because they have a physical meaning in the sense that all weights are positive. Many versions of NMF exist, for example, NMF with different constraints, for example, finding orthogonal basis.

Figure 4:
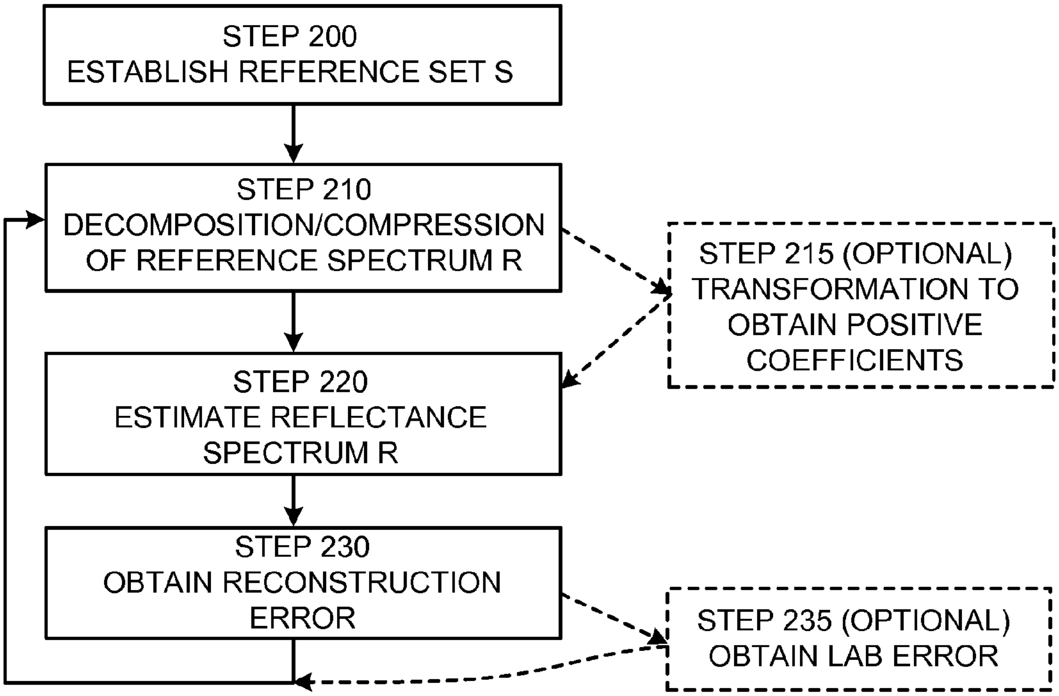
FIG. 4 illustrates a flow chart of the steps of an implementation of the disclosure.

In some implementations, the reference set of spectrum S is used to establish a set of functions F. More specifically, the PCA axis are constructed using the reference set S, and then the principle components are transformed into another space (i.e., function space) using the constraint that the new coefficients are all positive. Referring to FIG. 4, a reference set of spectrum S is established in step 200. In step 210, the spectrum compression (i.e., dimension reduction) C into the function space is given by the following equation:

$$C=F^{t}s \qquad \text{(equation 1)}$$

The performance of the functions F can be evaluated (step 220) by inversing the operation and estimating the reflectance spectrum R (in the reconstruction space) using, for example, the pseudo-inverse operator given by the following equations:

$$H=(F^{t}F)^{-1}F^{t} \qquad \text{(equation 2)}$$

$$R=H^{2}C \qquad \text{(equation 3)}$$

In some implementations, the error of the reconstruction of the reflectance spectrum R is obtained, for example, by using the Frobenius norm (step 230). In other implementations the error of the color reconstruction (step 235) is obtained using the Delta E CIE LAB error between the LAB values, of the real (or reference) spectrum S and the reconstructed spectrum R. Use of the error information allows for a comparison of performance in reconstructing the reference spectrum S so that the number of functions in function set F can be determined based on a desired level of performance (or acceptable error). For example, predetermined thresholds or acceptable ranges of error (e.g. Delta E CIE LAB error or Frobenius norm) can be established and the number of functions within function set F can be varied in order to determine the number of functions needed to satisfy the predetermined thresholds for error performance In some implementations, a reference set of spectrum S is decomposed using a dimension reduction technique (e.g., PCA) and represented by the following singular value decomposition:

$$s=F\Sigma Q^{t} \qquad \text{(equation 4)}$$

Figure 11:
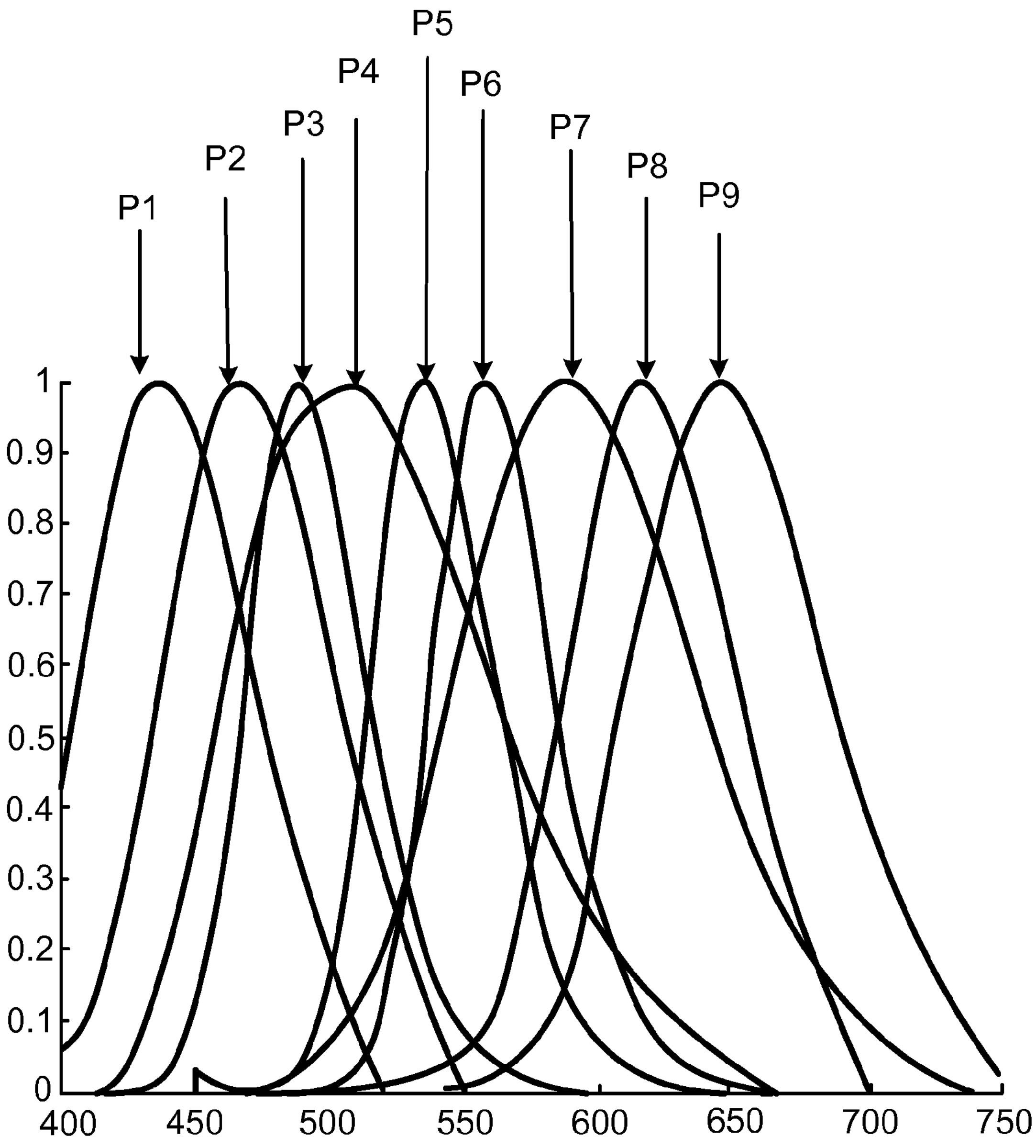
FIG. 11 illustrates a set of spectrum for an example group of nine phosphors used to create light emitting diodes.
Figure 12:
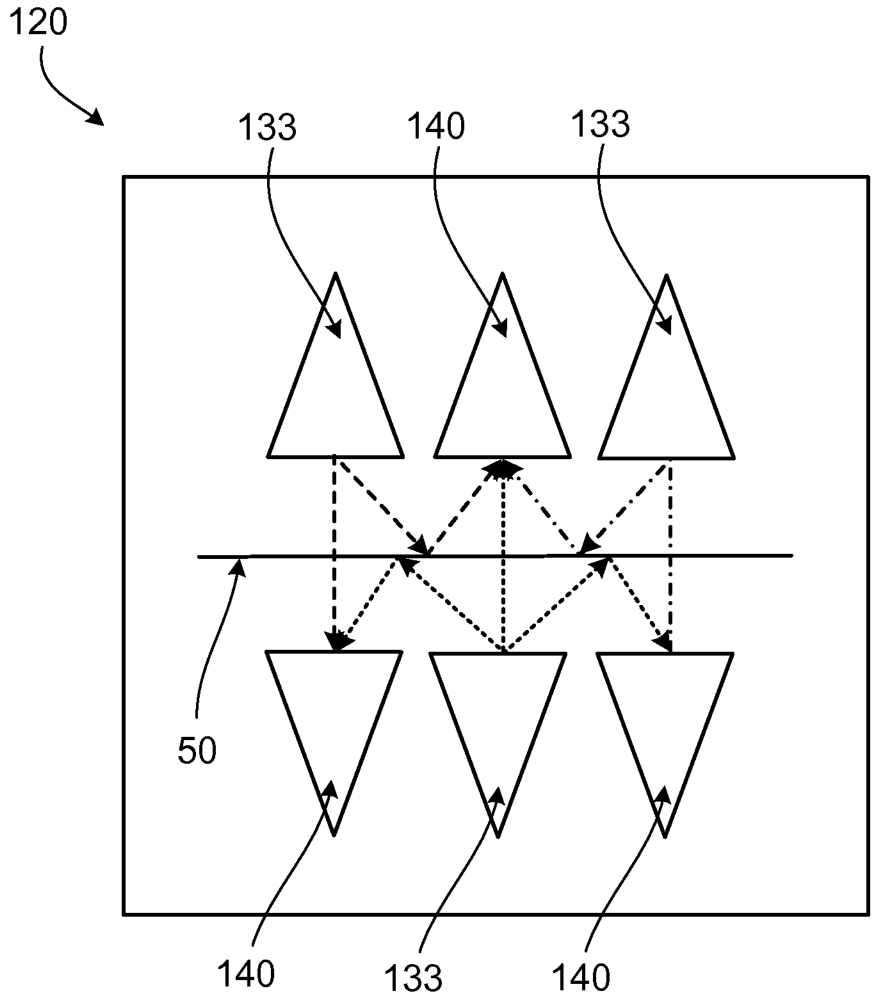
FIG. 12 illustrates reflectance from and transmission through an item of currency according to an implementation.
Figure 13:
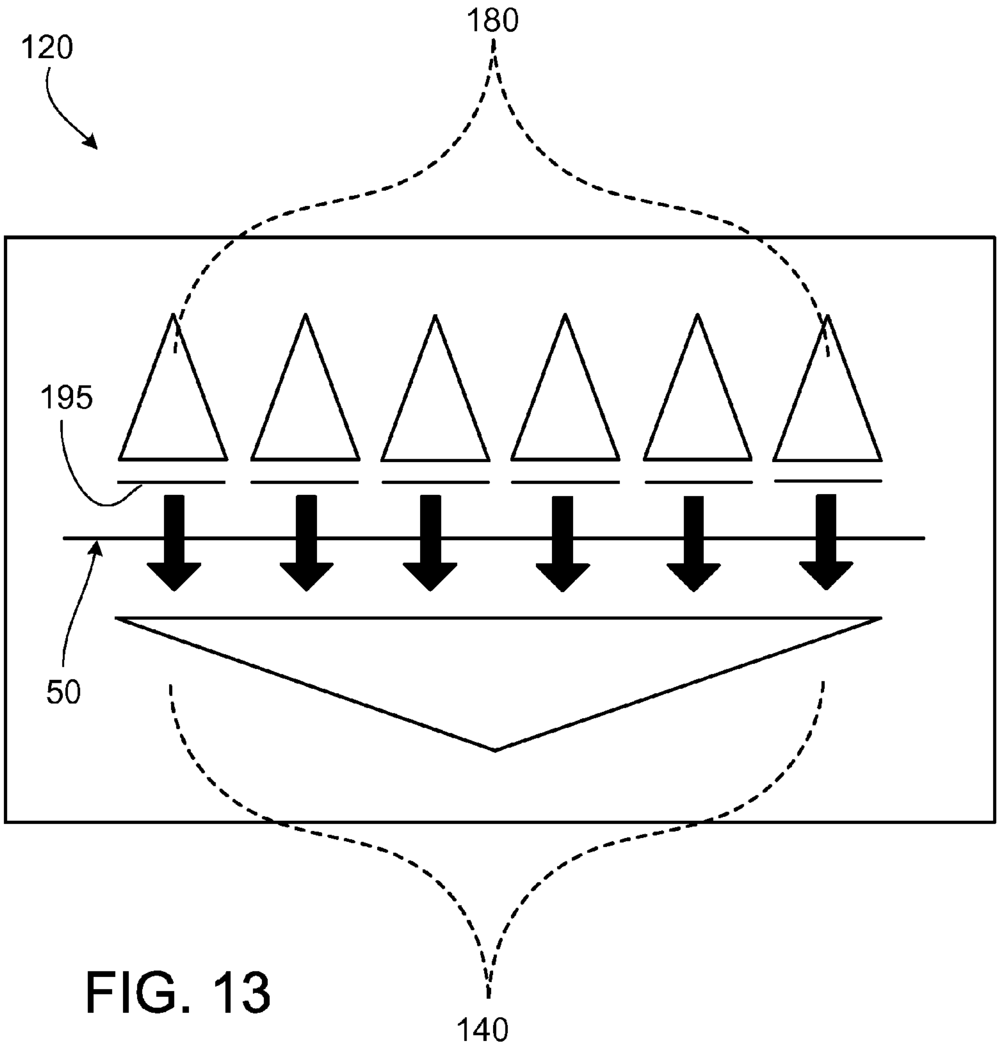
FIG. 13 illustrates an implementation utilizing at least one specified physical filter coupled to a broadband source.
Figure 14:
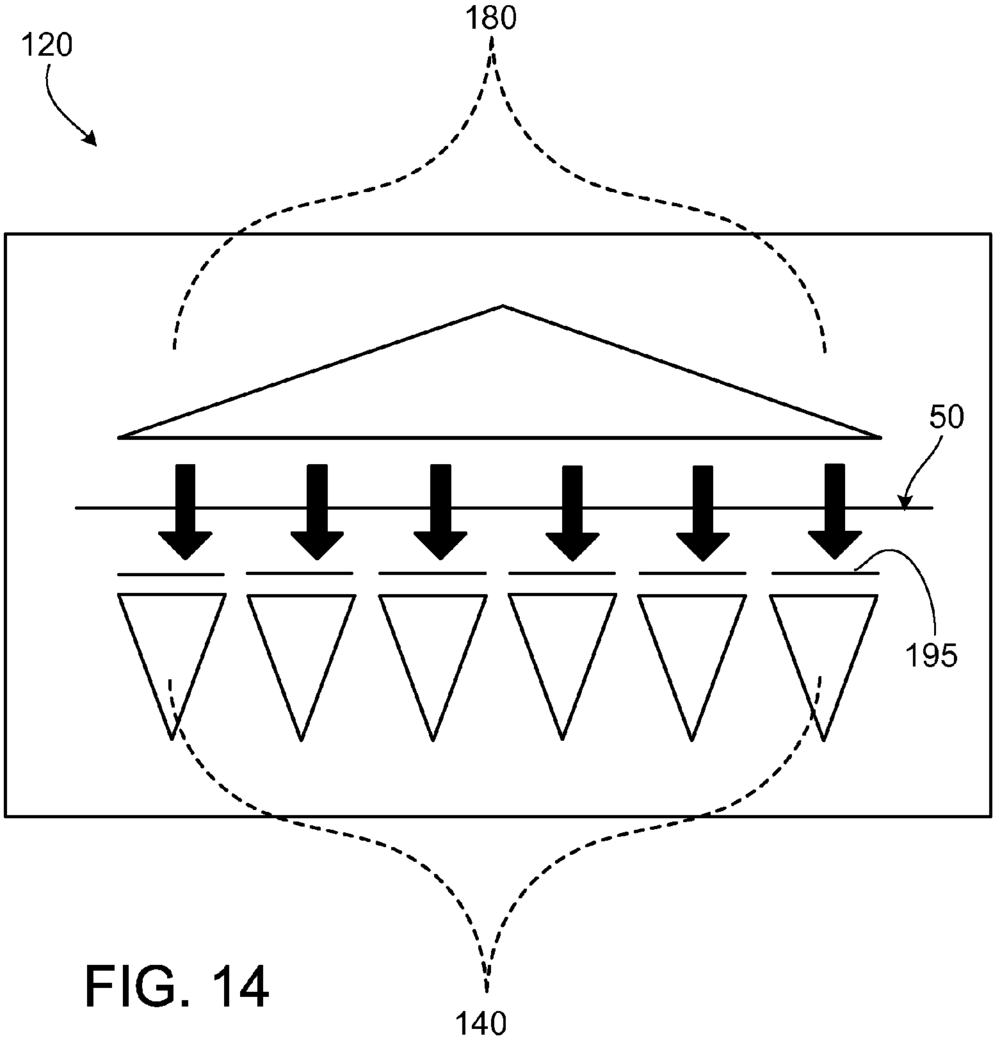
FIG. 14 illustrates an implementation utilizing at least one specified physical filter coupled to at least one receiver.

In equation 4, F is a set of eigenvectors (i.e., functions). The number of eigenvectors (i.e., functions) can be established in relation to a desired level of performance in reconstructing the reference set of spectrum S. For example, F can be a set of 6 eigenvectors (i.e., functions), but any other number of eigenvectors can be used without varying in scope from the present disclosure. In other implementations, an initial number of functions in set F can be selected and the results obtained from step 230 and/or step 235 can be used to determine if more or less functions in set F are needed (as shown in FIG. 4). In some implementations, at least one function can be established for use in combination with a plurality of standard LED's or sources (e.g., red, blue, green, and infrared). In such an implementation, a set of standard LED's (e.g., red, blue, and green) are arranged in validation apparatus 10 with at least one specified source 133 determined from the decomposition of reference set S as shown in FIG. 11. In other implementations, at least one broadband source 131, having a specified physical filter 135 associated therewith, is arranged with a plurality of standard LED's.

For the purposes of the disclosure, the term broadband source refers to a source with an emission spectrum having relatively constant intensity across either the full spectrum (e.g., visible and/or non-visible) or relatively constant intensity across a very broad range of wavelengths.

Following the decomposition of the reference set of spectrum S (e.g., using PCA), a constrained linear transformation of F is performed to obtain positive functions. More specifically it can be desirable to find a set of new functions $\tilde{F}$ given by the following equation:

$$\tilde{F}=FA \text{ subject to } \tilde{F}\geq 0 \qquad \text{(equation 5)}$$

Figure 5:
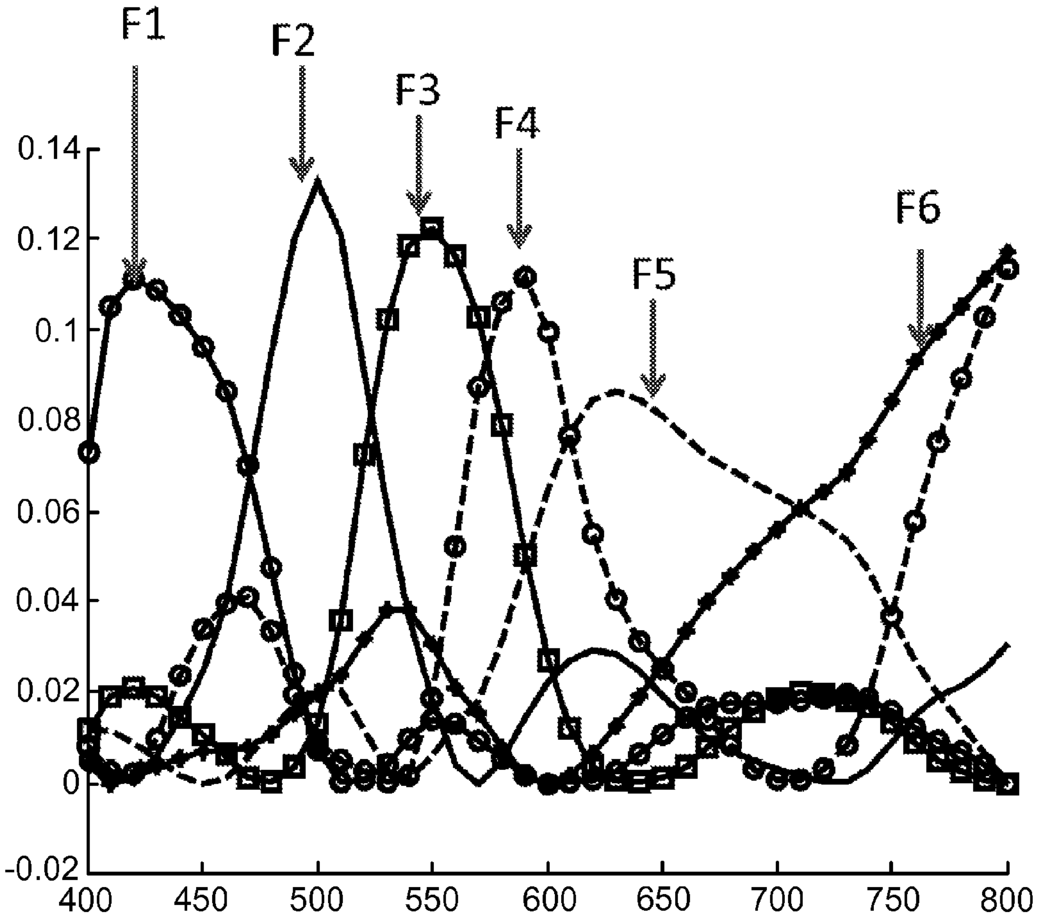
FIG. 5 illustrates the spectrums for a set of filters from an implementation of the disclosure.
Figure 6:
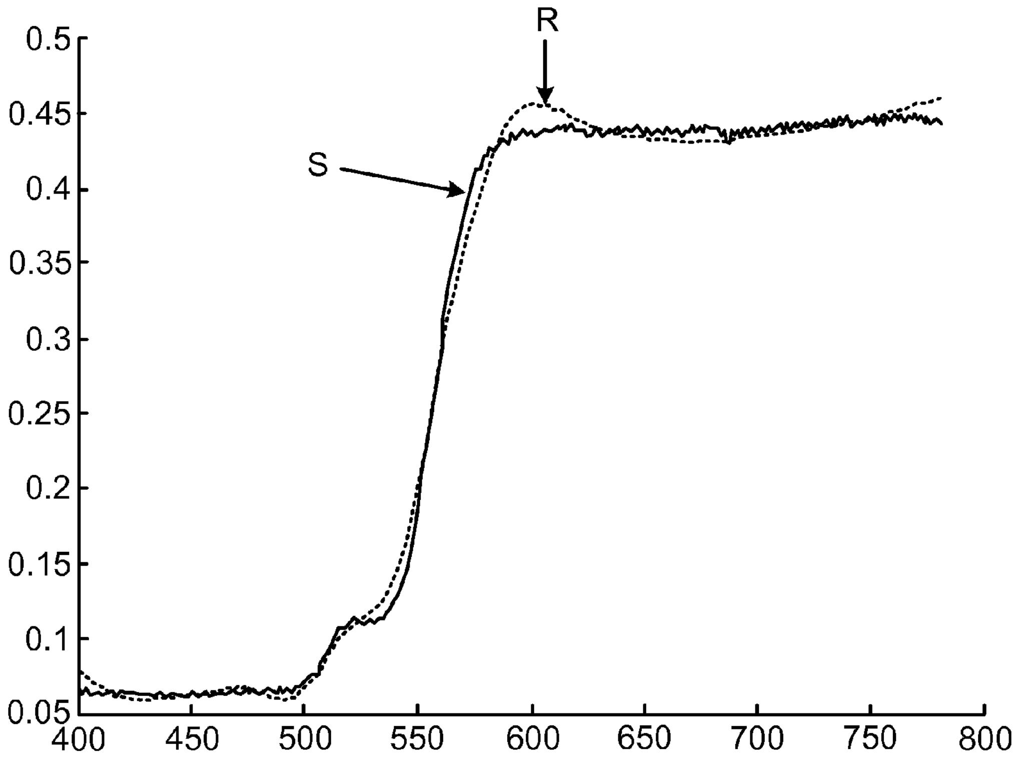
FIG. 6 illustrates a comparison of the reference spectrum S and the reconstructed spectrum R.
Figure 7:
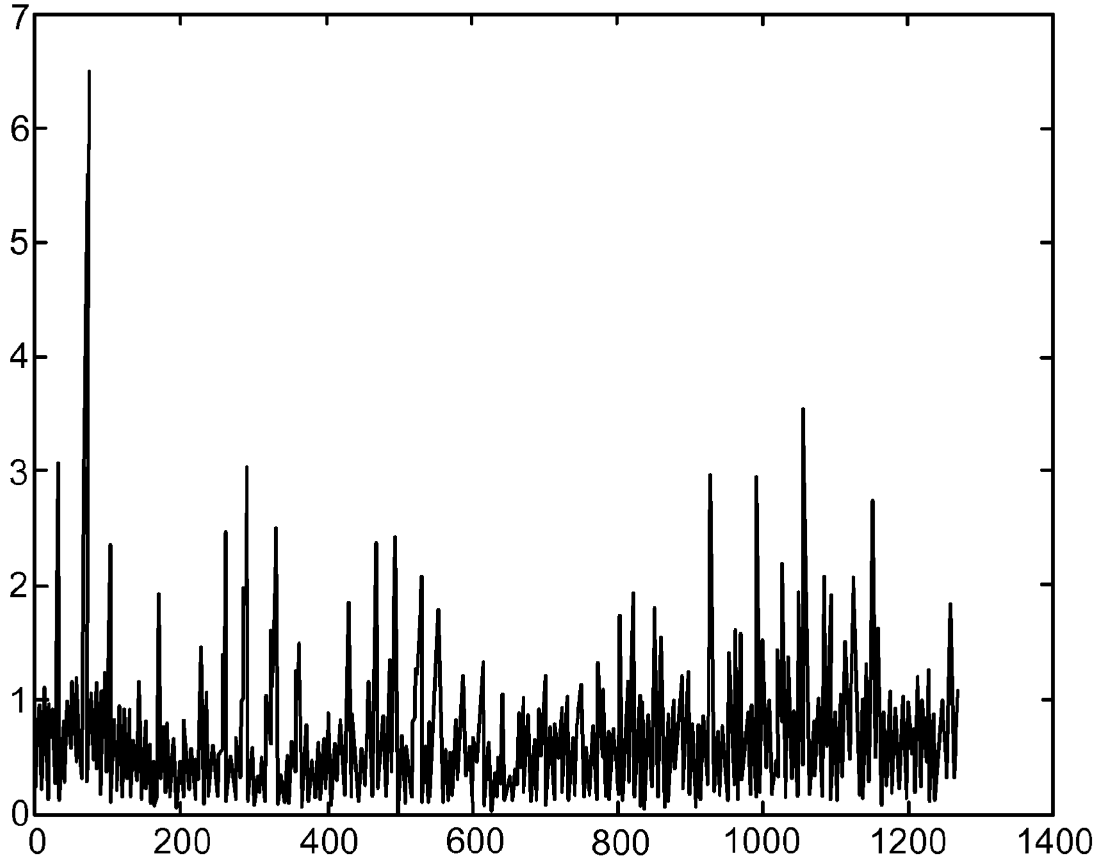
FIG. 7 illustrates the Delta E CIE LAB error for an example reconstructed spectrum R.
Figure 8:
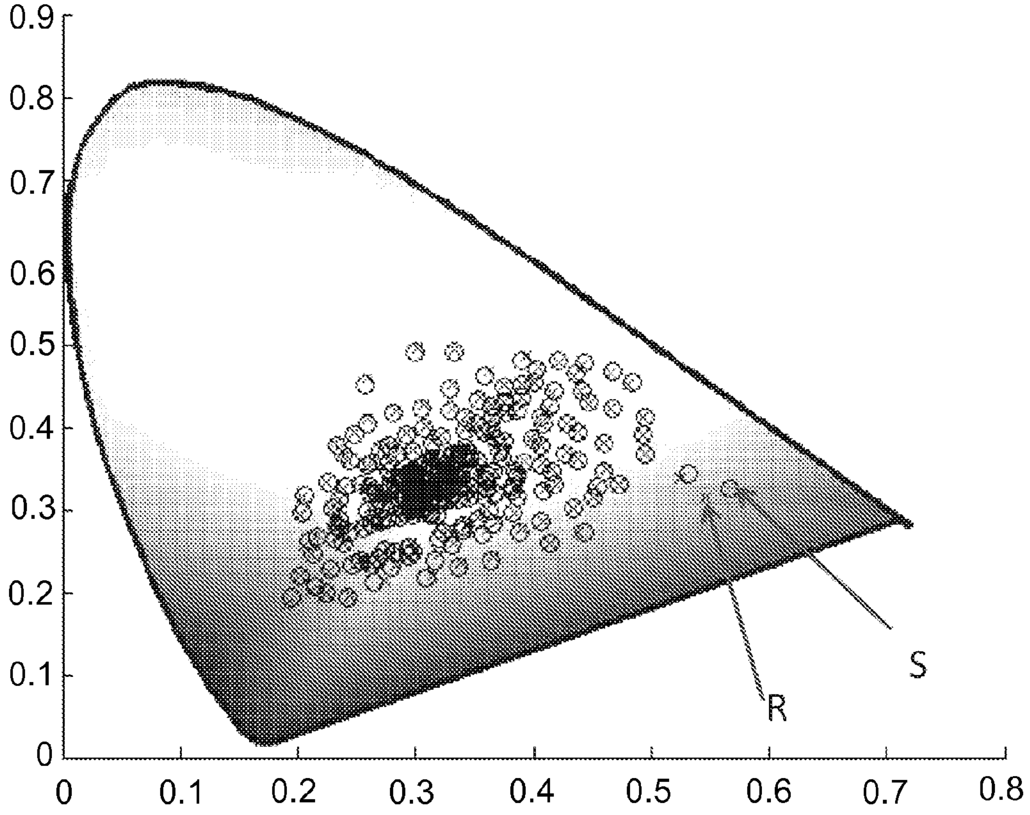
FIG. 8 illustrates a color comparison of the reference spectrum S and the reconstructed spectrum R.
Figure 9:
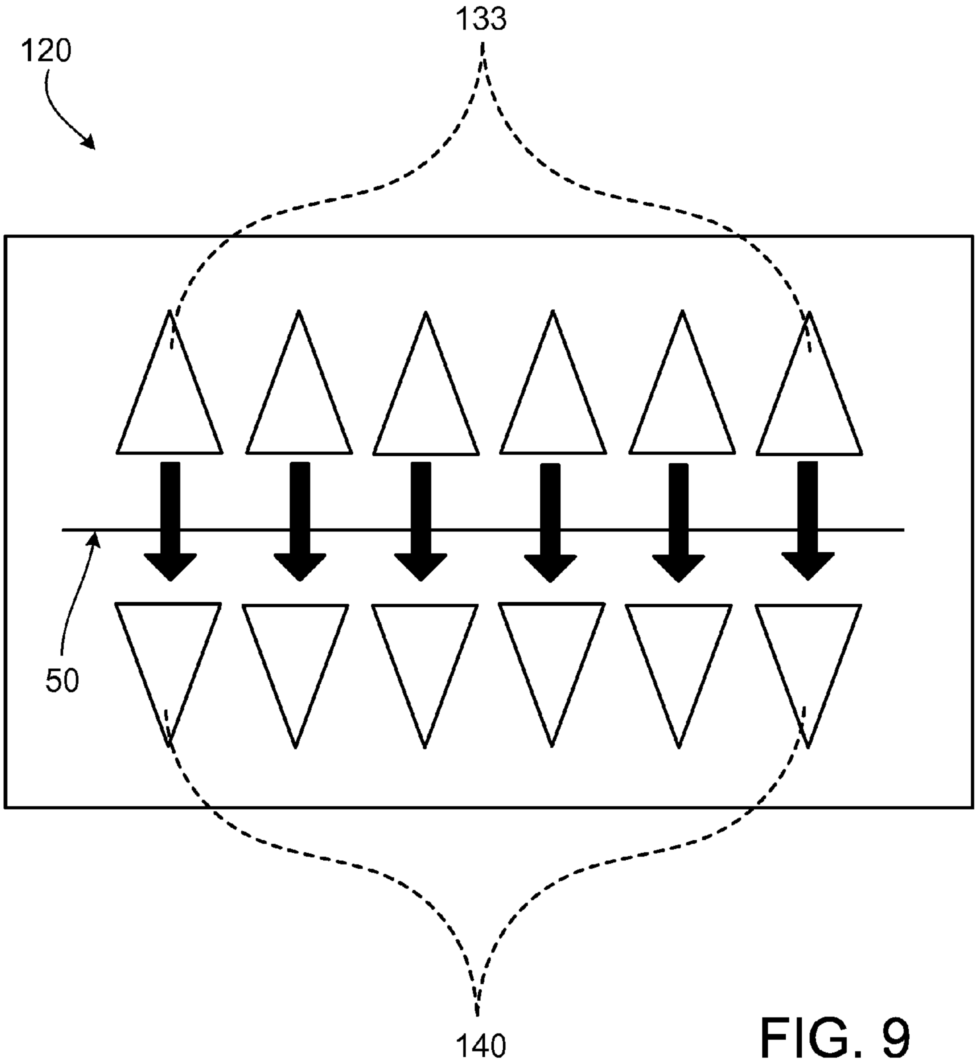
FIG. 9 illustrates an example implementation with validation unit including a set of six unique sources and six receivers for illuminating a document.
Figure 10:
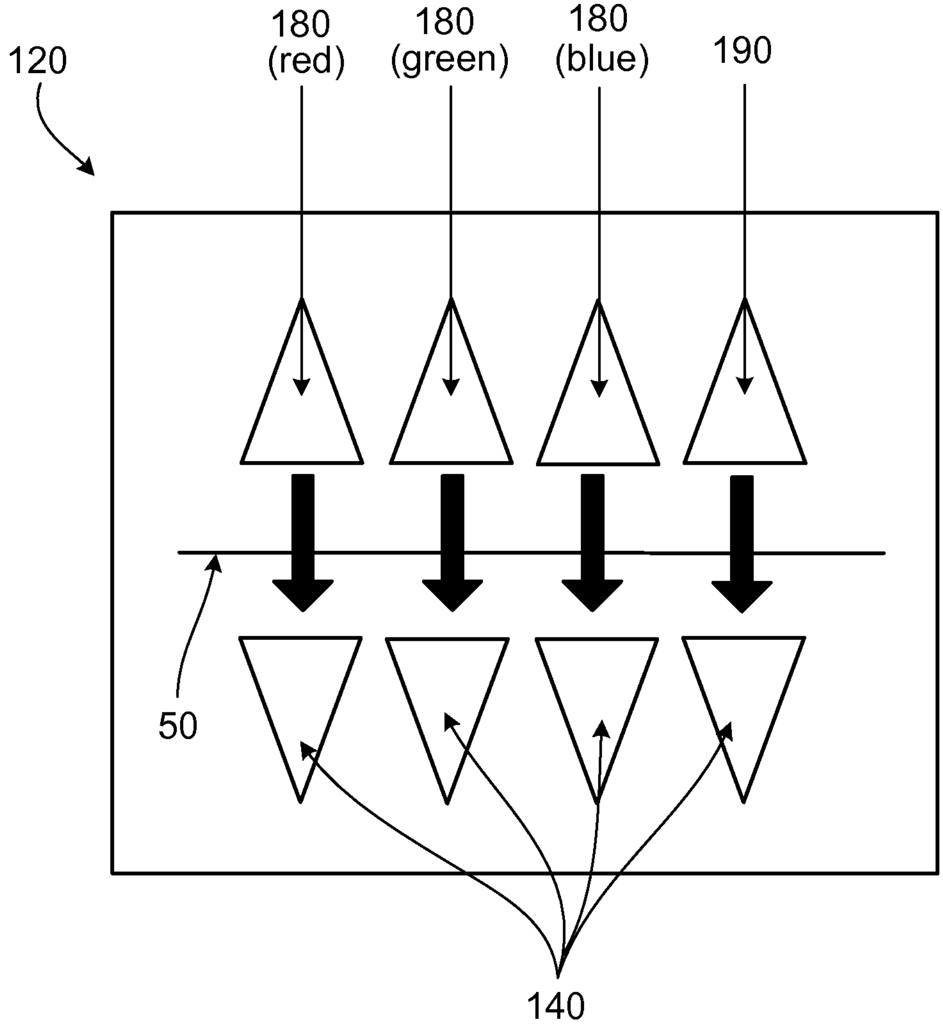
FIG. 10 illustrates an example implementation of the disclosure with a validation unit including three unique sources and receivers showing both light reflected on and light transmitted through a document.

FIG. 5 shows an example of the results from the above method when the set of functions F contains 6 functions (F1 thru F6). FIG. 6 shows a comparison of the reference set of spectrum S and the reconstructed spectrum R using 6 functions. FIG. 7 shows the Delta E CIE LAB error for each patch in the reference set based on the set of functions F having 6 functions. FIG. 8 shows a comparison of the reference set of spectrum S and the reconstructed spectrum R in the color space, using 6 functions in function set F.

In some implementations, the sources 133 are specified using the disclosed method for establishing a set of functions F such that each specified source 133 have an emission spectrum similar to one of the functions in set F. More particularly, the material used to manufacture certain sources (e.g., the phosphor in LEDs) can be selected and/or mixed in a predetermined manner in order to obtain performance characteristics similar to the functions of function set F. For example, there can be a set of phosphors P used to construct LEDs each having a specific spectrum. In other implementations, the set of phosphors P can be a component of an excitation element coupled to an emitting source. From previous examples, a function set F has a respective spectrum as shown in FIG. 5. Therefore given the set of functions F=F1, F2, F3, F4, F5, F6 an approximation of each function can be made using a mix of phosphor spectrum by forming a non negative least square problem. If we use, for example 9 phosphors {P=P1, P2, P3, P4, P5, P6, P7, P8, P9}, a plurality (for example 6) of specified sources 133 can be established. For each F, a matrix A can be found that minimizes:

$$\|P*A_i-Fi\| \text{subject to } A_i>=0.$$

Matrix A provides the quantity of each phosphor present in each specified source 133 as shown below:

$$A=\begin{pmatrix} P_{1F1} & P_{1F2} & P_{1F3} & P_{1F4} & P_{1F5} & P_{1F6} \\ P_{2F1} & P_{2F2} & P_{2F3} & P_{2F4} & P_{2F5} & P_{2F6} \\ P_{3F1} & P_{3F2} & P_{3F3} & P_{3F4} & P_{3F5} & P_{3F6} \\ P_{4F1} & P_{4F2} & P_{4F3} & P_{4F4} & P_{4F5} & P_{4F6} \\ P_{5F1} & P_{5F2} & P_{5F3} & P_{5F4} & P_{5F5} & P_{5F6} \\ P_{6F1} & P_{6F2} & P_{6F3} & P_{6F4} & P_{6F5} & P_{6F6} \\ P_{7F1} & P_{7F2} & P_{7F3} & P_{7F4} & P_{7F5} & P_{7F6} \\ P_{8F1} & P_{8F2} & P_{8F3} & P_{8F4} & P_{8F5} & P_{8F6} \\ P_{9F1} & P_{9F2} & P_{9F3} & P_{9F4} & P_{9F5} & P_{9F6} \end{pmatrix}$$

Using the example of Matrix A, a group of 6 specified sources 133 can be constructed with a mix of phosphors P1 thru P9. For example specified source #1 could be constructed with combination of phosphors $\{P_{1F1}; P_{2F1}; P_{3F1}; P_{4F1}; P_{5F1}; P_{6F1}; P_{7F1}; P_{8F1}; P_{9F1}\}$ such that it approximates function F1. In some implementations the actual mix of phosphors can be adjusted to account for losses and/or absorptions that may occur due to the combination of multiple phosphors such that the emission spectrum of specified source 133, having a mixture of phosphors, is similar to an approximating function used to reconstruct the original reference spectrum S.

Similarly any number of specified sources can be created using a predetermined group of functions F established by the method of the disclosure and a group of source manufacturing materials. It is contemplated that other types of sources, and thus other types of materials, can be used to construct specified source 133 without varying in scope from the present disclosure. For example, materials used for organic LEDs, fluorescent light tubes, or any other source commonly know to those skilled in the arts can be used to create a set of specified sources 133.

In some implementations, the currency validation apparatus 10 comprises a set of specified sources 133, each corresponding to an approximating function for estimating the reflectance spectrum R from the set of reference spectrum S. For example, a validation apparatus 10 includes 6 specified sources 133 which have been constructed such that each one has an emission spectrum similar to the approximating functions F established by approximating the reflectance spectrum R from the set of reference spectrum S. The number of specified sources 133 used in validation apparatus 10 can be more or less than the six specified sources disclosed in the foregoing example.

In practice, the number of sources 133 used in validation apparatus 10 can be selected based on the desired performance (e.g., Delta E CIE LAB error or Frobenius norm) and/or certain constraints (e.g., cost, acceptance rate, or rejection rate). In some implementations, validation apparatus 10 is arranged to include a plurality of standard LED's 180 (e.g., red, green, and blue; or red, green, blue and infrared), at least one specified source 190 and at least one receiver 140 for receiving light from sources 180 and 190. Alternately, a specified source 190 can be retrofit into an existing validation apparatus 10 (i.e., already having a plurality of standard LED's) such that performance of validation apparatus 10 is enhanced (e.g., by improving Delta E CIE LAB error). More particularly, specified source 190 can be configured such that its' spectral emission is similar to that of at least one currency item to be classified by validation apparatus 10.

In some implementations the reference set S used to determine the characteristics of the specified sources is different from other reference sets in order to optimize the performance of validation apparatus 10.

In other implementations, validation apparatus 10 includes a broadband source 160 with a generally broad emission spectrum such that a plurality of specified filters derived from function set F are included in apparatus 10 such that reconstruction of the original spectrum S can be accomplished. The set of functions F is derived such that the relationships of equations 1 thru 5 are satisfied. In implementations whereby physical filters are coupled with a broadband source (or plurality of broadband sources) 180 allows for flexibility in design such that apparatus 10 can be tuned for performance to satisfy any predetermined criteria (e.g., Delta E CIE LAB Error or Frobenius norm).

In some implementations, the at least one function established from the methods of the disclosure, result in a particular spectrum shape. For example, in an implementation of 6 physical filters (or sources or mixed light) there can be at least one filter having a spectral shape having a large band and at least two lobes as shown in FIG. 5 (e.g., F2). In some configurations a filter can have a large band higher than 35 nm (e.g., roughly 50 nm or more at half of the peak intensity). The number of filters implemented can vary. The corresponding changes in spectral shapes for each resulting filter are not limitations and, therefore, variation is within the scope of the present disclosure.

Classification of currency items can be accomplished in either the function space (i.e., using the direct data obtained from the at least one receiver) or in the reconstructed spectrum space (i.e., using the approximation functions to reconstruct the original spectrum). In an implementation for which classification occurs in the function space, classification of an inserted item can be made using traditional classification techniques (e.g., Malahanobis Distance, Feature Vector Selection, or Support Vector Machine). In an implementation for which classification occurs in the reconstructed space, the set of reconstructed reflectance measurements can be used with metamerism theory to classify at least one item 50. Classification in the reconstructed space can include the comparison of a reference response (for example stored in memory) with the reconstructed response of an inserted item such that a determination of a metameric match can be made. U.S. Provisional Patent Application Ser. No. 61/137,386 (incorporated by reference) discloses various techniques for classifying an item of currency using metameric theory and various classification techniques and algorithms.

Figure 15:
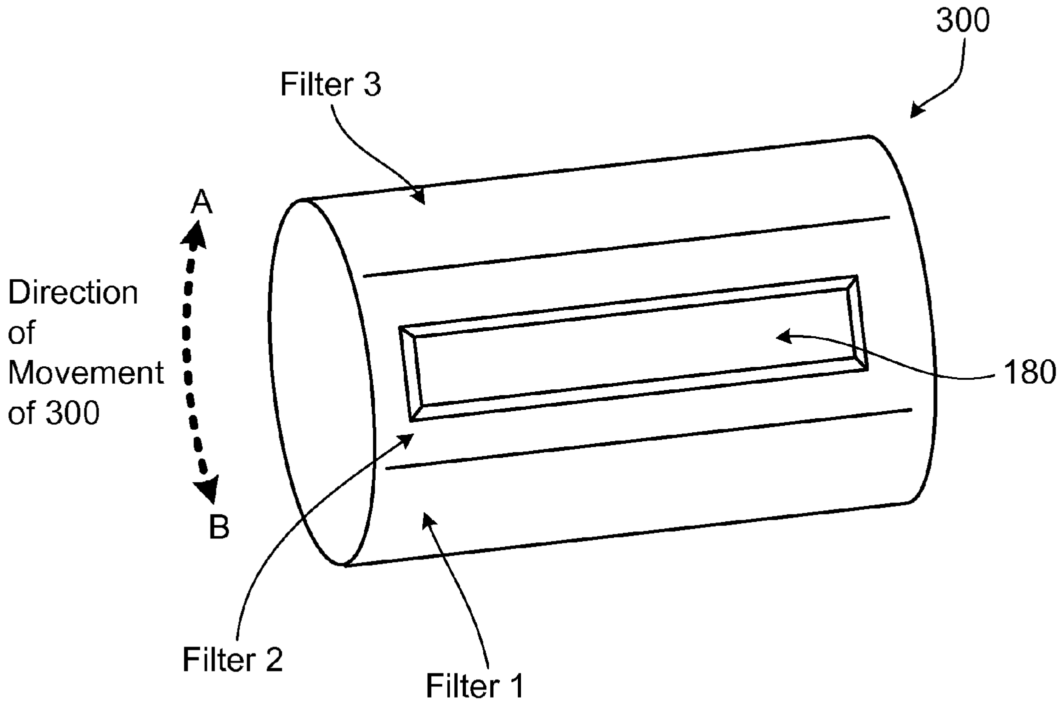
FIG. 15 illustrates an example of a filter apparatus.

In some implementations, a broadband source 180 is coupled with a plurality of physical filters 195 each having a spectral transmission spectrum similar an approximating function from the disclosed method. For example, a broadband source 180 can be coupled to a moveable filter apparatus 300 as shown in FIG. 15. More specifically, movable filter apparatus 300 is comprised of a plurality of physical filters (F1, F2, F3 . . . ) and is selectively movable between a plurality of positions relative to broadband source 180. FIG. 15 shows broadband source 180 coupled to filter apparatus 300 at position Z1 whereby filter F1 is positioned for transmitting filtered light from broadband source 180. Similarly, filter apparatus 300 can be moved such that any one of the plurality of filters can be positioned for transmitting filtered light from broadband source 180 there through.

For example, filter apparatus 300 can be implemented as a generally curved housing containing a plurality of filters as shown in FIG. 15. In some implementations filter apparatus 300 can be slidingly moved between a plurality of positions 1 thru 3 (e.g., having 3 filters) so as to couple a particular filter with broadband source 180 for transmission of light emitted there through.

In other implementations, the document validation apparatus 10 can include a plurality of specified sources coupled to a light pipe, and an integrating sensor. In such an exemplary implementation, each of the plurality of specified sources can be controlled using pulse width modulation in order to manage the amount of light emitted from each source into the light pipe. Such an implementation allows for the mixing of a set of specified sources similar to previously disclosed implementations of mixing phosphors or other substance used as a component in an excitation element to produce an overall emitted spectrum from the light pipe similar to an approximating function for reconstructing the reference spectrum R.

Figure 16:
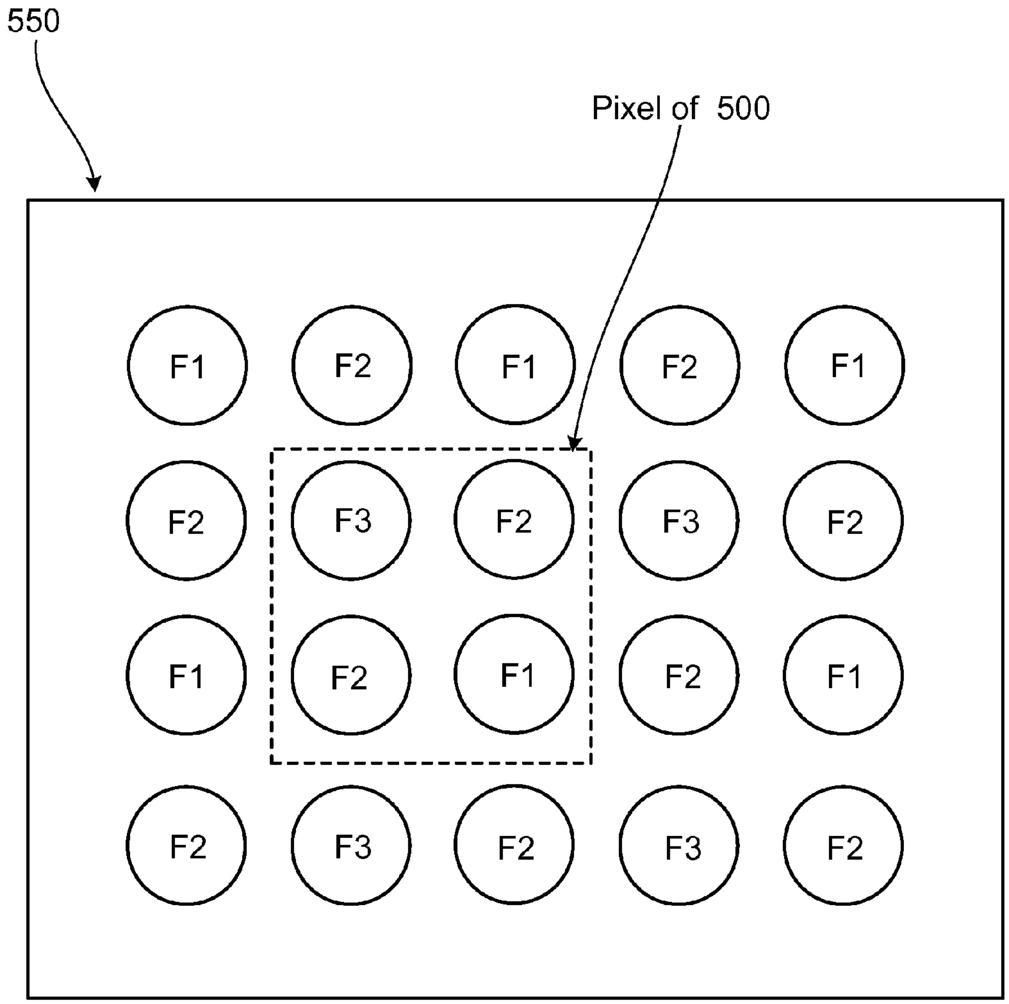
FIG. 16 illustrates an example of a sensor array.
Figure 17:
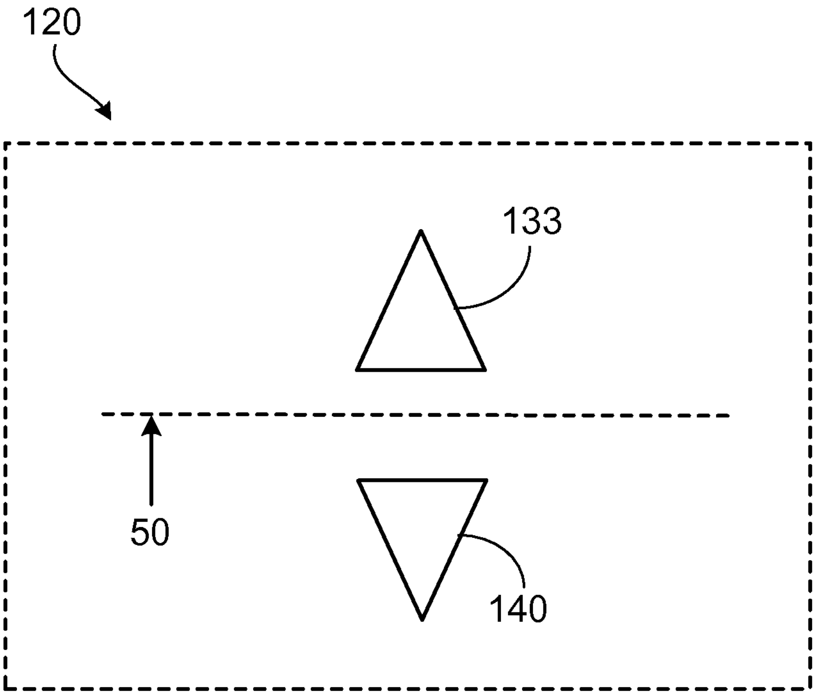
FIG. 17 illustrates an example of a sensing unit.
Figure 18:
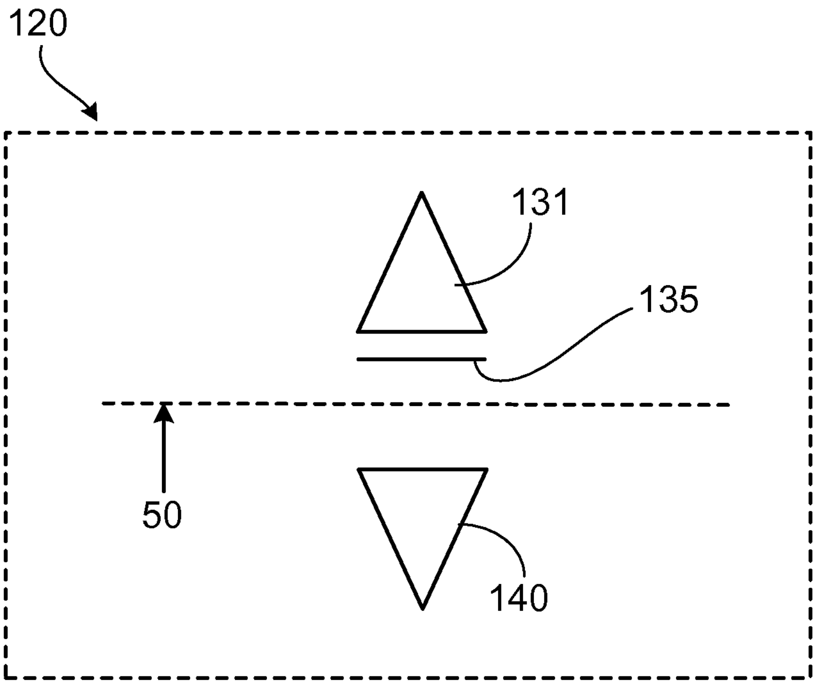
FIG. 18 illustrates an example of a sensing unit.

In an implementation, document validation apparatus 10 can include at lease one broadband source and a CCD sensor 500 having a plurality of specified physical filters (or excitation elements) associated therewith (as shown in FIG. 16). In an exemplary implementation, light emitted from a broadband source is transmitted through a sensor array 550 coupled to sensor 500 and therefore received by CCD sensor 500. Each pixel in the CCD sensor can be estimated using, for example, a Bayer algorithm to find the "mixed" light received so as to be comparable to an approximating function as described herein. FIG. 16 shows an exemplary implementation of such a configuration. Other configurations of filter array 550 as shown are contemplated where a different distribution of specified filters are therein arranged and therefore are not outside the scope of the disclosure.

In an implementation as in FIG. 16, the center of the pixel can be calculated using a Bayer type algorithm so that the actual light received at a particular pixel of sensor 500 can be a combination of the surrounding filters of filter array 550 in order to sense a response similar to an approximating function for reconstructing the original reference spectrum S.

Other implementations, including variations and modifications, are within the scope of the claims.

What is claimed is:

1. A validation apparatus comprising:

at least one broadband source for illuminating an item of currency;

at least three specified physical filters, wherein each of the at least three specified physical filters has a transmission spectrum similar to at least one approximating function for reconstructing a predetermined reference spectrum, the reference spectrum being similar to an emission spectrum of at least a portion of a document, wherein each of the at least three specified filters filter light emitted from each respective broadband source such that the resulting transmission spectrum is similar to the predetermined reference spectrum;

at least one receiver for receiving filtered light emitted from the at least one broadband source;

a transportation unit for transporting the item of currency within the validation apparatus;

wherein the at least three specified physical filters are positioned between the at least one broadband source and the at least one receiver; and wherein the light received by the at least one receiver is at least one of light reflected by or light transmitted through the item of currency.

2. A validation apparatus according to claim 1 wherein the resulting light filtered by the at least three specified filters is at least one of the visible or non-visible light.

3. A validation apparatus according to claim 1 wherein each of the broadband sources is energized in a predetermined manner.

4. A validation apparatus according to claim 1 wherein the transportation unit is arranged to include a plurality of transportation units configured to form a continuous transportation path.

5. A validation apparatus according to claim 1 wherein the transportation unit is arranged to transport the currency item past the at least one broadband source and the at least one receiver.

6. A validation apparatus according to claim 1 wherein the item of currency is classified using the received light from each of the at least filtered broadband sources.

7. A validation apparatus according to claim 6 wherein the classification of the currency item is performed in a function space.

8. A validation apparatus according to claim 6 wherein the classification of the currency item is performed in a reconstruction space.

9. A validation apparatus according to claim 1 further comprising a processor.

10. A validation apparatus according to claim 9 wherein the processor is configured for classifying the currency item.

11. A validation apparatus according to claim 1 further comprising a memory unit operatively coupled to the processor.

12. A validation apparatus according to claim 11 wherein the memory unit is configured to store a classifier used to classify at least one currency item.

13. A validation apparatus according to claim 1 wherein at least one of the at least three specified filters has an emission spectrum having a band of at least 50 nanometers.

14. A validation apparatus according to claim 13 wherein the at least one of the at least three specified filters has an emission spectrum having a large band and at least two lobes.

15. The validation apparatus of claim 10, wherein the at least one broadband source is at least 3 broadband sources and the at least 3 specified physical filters are each coupled to one of the at least 3 broadband sources.

16. The validation apparatus of claim 1, wherein the at least one receiver is at least 3 receivers and wherein the at least 3 specified physical filters are each coupled to one of the at least 3 receivers.

17. A validation apparatus comprising:

a plurality of common sources for illuminating an item of currency, wherein at least one common source has an emission spectrum similar to at least one of Red light, Blue light, Green light or infrared light;

at least one specified source for illuminating the item of currency, wherein the emission spectrum of the at least one specified source is similar to a portion of an emission spectrum of at least an item of currency to be classified by the validation apparatus;

a receiver for receiving light emitted from at least one of the plurality of common sources or the at least one specified source;

a transportation unit for transporting the item of currency within the validation apparatus;

wherein the validation apparatus classifies the currency item based in part on at least one of light reflected on or transmitted through the currency item.

18. A validation apparatus according to claim 17 wherein one of the common sources has an emission band of between 640 nm-700 nm.

19. A validation apparatus according to claim 17 wherein the at least one specified source has an emission spectrum similar to a particular item of currency to be classified by the validation apparatus.

20. A validation apparatus according to claim 17 wherein the at least one specified source is an LED constructed from a plurality of phosphors.

21. A apparatus according to claim 17 wherein the at least one specified source is a broadband source with a specified physical filter coupled thereto such that the transmission spectrum from the specified physical filter is similar to at least one currency item to be classified by the validation apparatus.

22. A validation apparatus according to claim 17 wherein the at least one specified source is a retrofit component of the validation apparatus.

23. A validation apparatus comprising:

a plurality of common sources for illuminating an item of currency, wherein at least one common source has an emission spectrum similar to at least one of Red light, Blue light, Green light or infrared light;

at least one specified source for illuminating the item of currency, wherein the emission spectrum of the at least one specified source is similar at least one approximating function for reconstructing a predetermined reference spectrum;

a receiver for receiving light emitted from at least one of the plurality of common sources or the at least one specified source; and a transportation unit for transporting the item of currency within the validation apparatus;

wherein the validation apparatus classifies the currency item based in part on at least one of light reflected on or transmitted through the currency item.

24. A validation apparatus according to claim 23 wherein one of the common sources has an emission band of between 640 nm-700 nm.

25. A validation apparatus according to claim 23 wherein the at least one specified source has an emission spectrum similar to a particular item of currency to be classified by the validation apparatus.

26. A validation apparatus according to claim 23 wherein the at least one specified source is an LED constructed from a plurality of phosphors.

27. A apparatus according to claim 23 wherein the at least one specified source is a broadband source with a specified physical filter coupled thereto such that the transmission spectrum from the specified physical filter is similar to at least one currency item to be classified by the validation apparatus.

28. A validation apparatus according to claim 23 wherein the at least one specified source is a retrofit component of the validation apparatus.

* * * * *